June 27, 1944.   R. B. POGUE ET AL   2,352,222
BRAKING APPARATUS
Filed Feb. 9, 1942
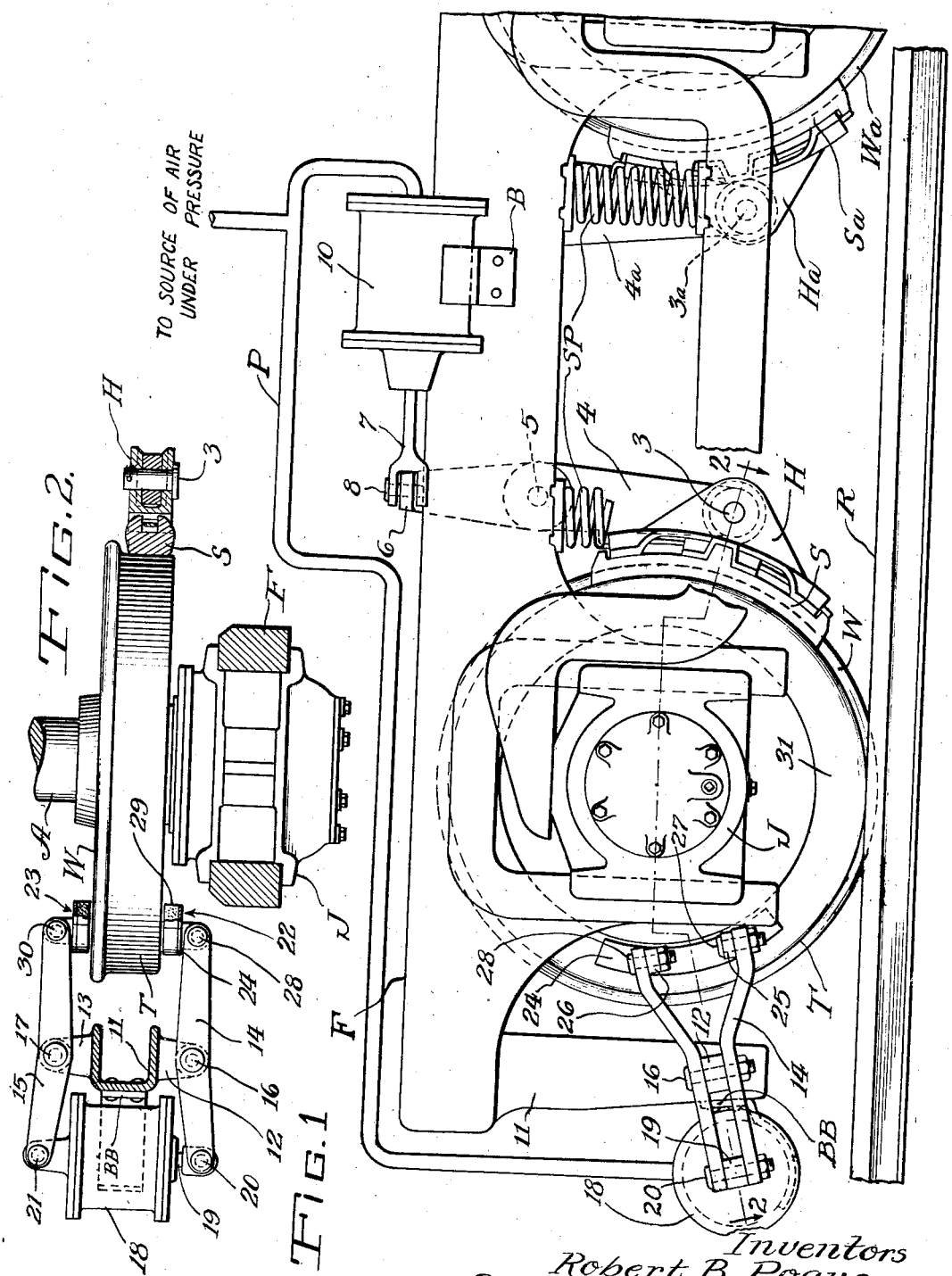
Inventors
Robert B. Pogue
and Maurice N. Trainer
By Wallace and Cannon Attorneys Patented June 27, 1944

2,352,222

UNITED STATES PATENT OFFICE 2,352,222

BRAKING APPARATUS

Robert B. Pogue, Orange, and Maurice N. Trainer, East Orange, N. J., assignors to American Brake Shoe Company, a corporation of Delaware Application February 9, 1942, Serial No. 430,123

16 Claims. (Cl. 188—33)

This invention relates to braking apparatus of the character employed on railway and like equipment.

Among the braking apparatus that have been used in railway and like equipment is that embodying metallic or composition shoes which are applied to the tread of a wheel at substantially diametrically opposed positions and which is commonly known as a clasp brake arrangement. It is known that particularly the application of metallic shoes to the tread of the wheel, as is done in such braking arrangements, has many beneficial results or effects among which is the cleaning of the tread of the wheel by the scrubbing action of the shoes when applied thereto whereby the tread is freed of rail splinters and the like which collect thereon.

Moreover, the heating of the tread, as an incident to the dissipation of energy in the course of a braking operation effected by the forceful application of the shoes of the aforesaid braking arrangement to the tread of the wheel, tends to counteract the cold rolling of, and hardening action on, the tread by the rolling thereof on the rail. Still further, in such braking arrangements, it is the tread and the portion of the wheel immediately therebelow that are heated as an incident to the aforesaid dissipation of energy and in the course of prolonged braking operations, or in braking operations that are effected repetitiously at frequent intervals, the heating of the wheel progresses inwardly from the tread thereof. It is known, however, that it is advantageous to uniformly heat metals, particularly where it is desired to counteract a hardening action or the like, and in the instance of a wheel of railway or like equipment we have found it to be advantageous to not only apply a shoe or shoes to the tread of a wheel but also to apply shoes to the axially inner and axially outer sides of the rim of the wheel for so to do effects a more uniform distribution of the braking heat in the portion of the wheel adjacent the braking surfaces thereon than is realized when a shoe or shoes is or are applied only to the tread of the wheel. This arises from the fact that in such arrangement the heat of braking is applied to the wheel at three related places, namely, on the tread and on each side of the rim, rather than merely at one place, namely, the tread, as is done in a clasp brake arrangement.

And yet another important advantage accrues from applying a shoe or shoes to an axially inner or axially outer side, or such sides, of a wheel and this resides in the better dissipation of the heat, generated as an incident to the dissipation of energy in a braking operation, than may be realized by applying a shoe or shoes only to the tread of a wheel. This apparently accrues from the fact that application of a shoe or shoes to the side, or the sides, of the rim of a wheel, or elsewhere on the axially inner or axially outer side, or such sides of the wheel, allows air to flow in all directions past such surface or surfaces on the wheel or the like to which the shoe or shoes is or are so applied, and particularly in a radial direction. However, when a shoe or shoes is or are applied to the tread or periphery of a wheel, the flow of air, for purposes of dissipating the heat, is primarily effective circumferentially and tends to cling to such tread or periphery. In any event it has been determined, as a result of numerous observations, that in the performance of the given amount of work, such as that attendant to effecting a braking operation, there is less temperature rise in the wheel in those instances where a shoe or shoes is or are applied to the side faces, such as the sides of the rim of the wheel, than there is in those instances where a shoe or shoes is or are applied to the tread or periphery of the wheel and in this respect we prefer to utilize the sides of the rim of the wheel for when this is done the aforesaid effect is more pronounced.

In view of the foregoing, among the important objects of our invention is to effect a braking operation by applying a braking element or braking elements, such as a shoe or shoes, to a surface or surfaces on the sides of a wheel or the like to thereby minimize heating of the wheel or the like as an incident to the dissipation of energy in the course of a deceleration so effected, and an object related to this is to promote more uniform distribution of the heat of braking in the portion of the wheel or the like adjacent to the braking surfaces thereon by applying braking elements such as shoes not only to one or both surfaces on the side of a wheel or the like, such as the sides of the rim of a wheel, but also to a peripheral surface, such as the tread of a wheel.

It is known that composition friction material is useful in braking operations, particularly in those entailing a composition friction material-to-metal engagement, for during the latter stages of a deceleration so effected there is, under certain conditions, a tendency toward a decrease in the effective retarding force, in contradistinction to the tendency toward an increase in the effective retarding force in the latter stages of a deceleration exhibited in those braking operations or decelerations entailing a metal-to-metal engagement. In many instances a tendency toward a decrease in the effective retarding force in the latter stages of a deceleration may be desirable. However, it has been observed that in those instances where shoes of composition material are employed in the hereinabove referred to clasp brake arrangement there may sometimes be objectionable heating of the tread of the wheel, especially where severe conditions are encountered as in those instances where there is an appreciable wheel load and a heavy sustained brake operation is effected. It may be that such objectionable heating of the wheel arises by reason of the fact that the flow of air, that assists in dissipation of the heat, is primarily circumferentially of the wheel, but in any event we have observed that if shoes of composition material are applied to surfaces on the sides of a wheel or the like, as for example to the sides of the rim of a wheel, there is much less objectionable heating of the wheel or the like than there is in those instances where shoes or the like are applied to the peripheral portion of a wheel or the like. In view of this, it is another object of this invention to enable decelerations to be effected by applying a braking element or braking elements, embodying at least a facing of composition friction material, to a surface or surfaces on the side or sides of a wheel or the like, for example, the sides of the rim of a wheel.

In our Letters Patent No. 2,248,383, patented July 8, 1941, the advantages accruing from the utilization of both a composition friction material-to-metal engagement and a metal-to-metal engagement in braking operations are described and, as there explained, such advantages are best realized by effecting the composition friction material-to-metal engagement and the metal-to-metal engagement independently of each other. Hence, it is among the objects of the present invention to utilize an arrangement of this character in such a way that substantially uniform distribution of the heat of braking in a member, such as a wheel, that is being decelerated will be promoted; and an object ancillary to the foregoing is to afford a metal-to-metal engagement and a composition friction material-to-metal engagement in such related positions that distribution of the heat of braking in a member, such as the wheel, as an incident to the dissipation of energy in the course of a braking operation effected by such an arrangement will be relatively uniform; and yet a further ancillary object is to afford a metal-to-metal engagement at the periphery of a member being decelerated, as for example on the tread of a wheel, and also a composition friction material-to-metal engagement on a surface or surfaces on the axially inner and axially outer side or sides of the member being decelerated, as on the axially inner and axially outer sides of the rim of a wheel, in closely related positions with respect to the radial plane of the wheel or other rotative member.

In some braking arrangements that have been utilized heretofore, shoes have been arranged to be engageable with axially inner or axially outer surfaces, or both such surfaces, on wheels or other rotative elements connected to the wheels to move in exact relation therewith. In such arrangements a relatively elongated support has been provided for the shoes or the like and a remote end of the support is fulcrumed on the frame of the vehicle on which the wheel is provided. Moreover, the other end of the support is connected to the journal box or other bearing support for the axle on which the wheel is mounted and such a box or the like is usually spring or otherwise resiliently connected to the vehicle frame and the shoes or the like are mounted on the support near the end thereof connected to the journal box or the like. It has been observed that in the course of decelerations effected by a braking arrangement of this character there is sometimes a tendency for the wheel being decelerated to, in effect, bounce on the surface on which it should roll and this has been observed to impair the desired adhesion between the wheel and the surface on which it should roll, as for example, a rail, and it has been observed that this ofttimes objectionably prolongs the deceleration since the foregoing objectionable condition adversely affects the adhesion. It is believed that the accrual of the aforesaid condition can be attributed to the free spring action which may arise in such an arrangement in the course of a deceleration since the spring action is not snubbed, and it is this that appears to impair the required rigidity and contribute to the aforesaid objectionable tendency toward reduction in adhesion, which may result in sliding of the wheel along the rail or the like.

It is therefore still another object of our invention to support the shoes or other brake elements that are to be applied to a wheel, disc or other rotating element so that the wheel, disc or the like will be snubbed in such a way as to reduce the tendency toward reduction of the adhesion between the wheel and the surface, such as a rail, on which it normally rolls; and other objects are to so support shoes or like brake elements as to be engageable with peripheral portions of rotative elements, such as the treads of wheels, and with axially inner or axially outer or both such surfaces on the rotative elements, as the axially inner or axially outer sides of the rim of a wheel, directly from the frame to which the rotative elements, such as wheels, are spring or otherwise resiliently connected so that the retarding force and applying forces attendant to action of the elements will be directly transmitted to the frame and thereby minimize the effect of the resilient connection and resultingly promote maintenance of the desired adhesion between the wheel and the surface, such as a rail, on which it rolls; to utilize, as far as possible, standard or conventional arrangements for supporting the shoes or the like and the wheels or the like and thereby enable the objects of this invention to be realized with a minimum of changes in existing equipment; and to afford axially inner or outer surfaces on the rotative elements of such dimensions that relative radial movement between such surfaces and the shoes or similar brake elements engageable therewith to effect decelerations will not impair the engagement desired to be maintained therebetween.

With respect to the immediately preceding object and to refer for example to wheels such as are used on passenger cars of railway equipment, such wheels are customarily about thirty-six inches in diameter and include a rim that is from about two inches to about three and one-fourth inches in thickness. All such wheels embody a mark, known as the condemning limit. It is required, when a wheel wears to this limit, that it be replaced. Now in those instances where, in pursuance of our invention, shoes or like brake elements are to be applied to the sides of the rim of a wheel, such as one of the aforesaid character, it will be advantageous in many instances to increase the thickness of the rim of the wheel inwardly as, for example, in the amount of one inch more than that which is now afforded, because so to do will insure that brake elements, such as shoes applied to the sides of the rim, will remain in engagement with the sides of the rim even though relative radial movement between such surfaces and the elements should occur in the course of a deceleration and so to do is still another object of this invention.

More specific objects, which are particularly related to the utilization of the present invention in railway equipment, are to employ that part of a standard or conventional clasp brake or equivalent arrangement that is normally utilized to support one shoe or the like in position to be engaged with the periphery or tread of a wheel, and to so arrange such equipment that the shoe carried thereby will engage the periphery or tread of the wheel in a location at least somewhat similar to that in which one shoe of a clasp brake arrangement, as aforesaid, engages the tread of the wheel; to so support a shoe or shoes or like element or elements engageable with the axially inner or axially outer, or both, sides of the rim of a wheel that engagement thereof with the wheel may be effected at a location corresponding to that at which one shoe of a clasp brake arrangement, as aforesaid, would customarily be disposed to be engageable with the tread or the periphery of the wheel; and to so relate a shoe engageable with the tread or peripheral portion of a wheel and a shoe or shoes engageable with the sides of the rim of the wheel that engagement with the tread of the wheel and engagement with at least one side of the rim of the wheel will be effected at substantially diametrically opposed positions relative to the wheel.

Other and further objects of the present invention will be apparent from the following description and claims and are illustrated in the accompanying drawing which, by way of illustration, shows a preferred embodiment and the principle thereof and what we now consider to be the best mode in which we have contemplated applying that principle. Other embodiments of the invention embodying the same or equivalent principle may be used and structural changes may be made as desired by those skilled in the art without departing from the present invention and the purview of the appended claims.

In the drawing,

Fig. 1 is a partially schematic side elevational view of a railway truck and wherein a selected embodiment of our invention is illustrated; and Fig. 2 is a horizontal sectional view taken substantially on the line 2—2 on Fig. 1.

While our invention may be used with a wide variety of equipment, we have, for the purpose of explaining the selected embodiment thereof, shown in the accompanying drawing one manner in which the invention may be utilized with railway equipment. Thus, in this drawing we have shown a frame F of a truck such as is commonly provided on railway equipment and in which usually two axles as A, of which we have shown but one, are journaled in bearings afforded in suitable journal boxes as J to thereby support wheels as W at opposite sides of the frame F, the wheels at corresponding sides of the frame being adapted to roll on rails as R. Springs as SP are interposed between the frame F and the support for the axles as A for the purposes well understood in the art.

In the preferred form of the present invention at least a part of a conventional clasp brake arrangement of, for example, the character disclosed in Baselt Patent No. 1,998,976, patented August 23, 1935, is utilized, and that portion of a clasp brake arrangement which is utilized in accordance with the present invention is diagrammatically illustrated in the accompanying drawing and, in accordance with the present embodiment of the invention, where a shoe as S is to be applied to the tread as T of the wheel as W, we have shown this shoe as being connected to a head as H that is pivotally connected, as indicated at 3, to a lever 4 pivotally mounted on the frame F, as indicated at 5, and which has a lug thereon that is connected to an equalizing bar 6 pivotally mounted on the frame F, and to which the free end of the rod 7 is pivotally interconnected as indicated at 8. The rod 7 leads from a piston or the like in the cylinder 10 that is supported by a bracket as B from the frame F. Air under pressure is supplied to the cylinder 10 through a pipe as P from a source of air under pressure under control of the usual brake control means when a braking operation is to be effected to thereby apply the shoe as S to the tread as T.

Another shoe as Sa is carried by a head as Ha which is pivotally connected as at 3a to a lever as 4a that corresponds, and which is arranged similarly, to the lever 4. By referring to Fig. 2, it will be seen that the shoes S and Sa are respectively engaged with the adjacent or inwardly disposed portions of the wheels W and Wa, respectively. Furthermore, the shoes S and Sa are preferably made of cast iron and are desirably reinforced in the manner well understood in the art. With respect to this arrangement of the shoes S and Sa it is to be understood that the illustrated arrangement for supporting these shoes in position to engage the wheels is illustrative of a wide variety of arrangements to which resort could be had within the purview of our invention, for desirably the shoes S and Sa are associated with the wheels in a manner which is conventional in so-called clasp brake or equivalent arrangements, the arrangement shown in the herein referred to Baselt patent being typical of the clasp brake arrangements of the character contemplated in this aspect of this invention. We have found it desirable to engage the shoes as S and Sa with the adjacent or inner portions of the wheels as W and Wa for so to do affords ample space for accommodating the portion of the braking arrangement which, in the present instance, is to cooperate with the axially inner and axially outer sides of the rims of the wheels as W and Wa.

Thus, in the present instance, we provide a brace 11 that depends from the frame F but which is rigidly connected thereto and ears as 12 and 13 are provided on opposite faces of this brace. Forked or two-armed levers 14 and 15 are pivotally and respectively connected to the ears 12 and 13, as indicated at 16 and 17, desirably intermediate the ends thereof so as to thereby afford levers of the first class. In the present instance a double acting cylinder 18 is mounted outwardly of the brace 11 and may be supported from the brace by a bracket as BB.

It will be understood that a brace as 11 and a cylinder as 18, as well as levers as 14 and 15 and associated parts, are disposed outwardly of the other wheel as Wa of a pair of wheels at a patricular side of a frame as F.

In the operation of our novel braking apparatus air under pressure is admitted to the cylinder 18 from a source of air under pressure as the pipe P and desirably under control of the same means as that controlling the admission of air to the cylinder 10 so that air under pressure is simultaneously supplied to the cylinders 10 and 18. Upon the admission of air to the cylinder 18 the rods as 19 connected to pistons or other movable elements in the cylinder 18 are forced outwardly away from opposite ends of the cylinder 18. The rods as 19 are respectively pivotally connected to adjacent ends of the levers 14 and 15, as indicated at 20 and 21, and when air under pressure is admitted to the cylinder 18, the levers 14 and 15 are pivoted about the pivotal mountings 16 and 17 thereof to thereby force the shoes, to be explained presently, and supported at the ends of the levers opposite the pivotal connections as 21 and 22, into engagement with the axially inner and axially outer sides or faces of the rim of the wheel as W.

In the present instance and in order to realize the advantages which arise from the use of both a composition friction material-to-metal engagement and a metal-to-metal engagement in a deceleration, which advantages are explained in our aforesaid Letters Patent No. 2,248,383, we have, as stated hereinabove, provided a metallic shoe as S to be engageable with the tread as T of the wheel as W to thereby afford a metal-to-metal engagement. Additionally, we provide the shoes, generally indicated by 22 and 23, which, as shown, are substantially segmental in outline and which embody opposed flat faces, and desirably the arcuate extent of such shoes is about sixty degrees along the annular surface to be engaged thereby. A backing plate as 24 is provided on the shoe 22 and a pair of lugs 25 and 26 is provided on this backing plate to have the ends of the arms of the lever 14, opposite those pivotally connected to the rod 19, pivotally connected thereto, as indicated at 27 and 28. A facing 29 of composition friction material is provided on the backing plate 24 of the shoe 22 and this facing of composition friction material is engageable with, in the present instance, the axially outer side or face of the rim of the wheel W. Moreover, the shoe 23 corresponds to the shoe 22 and is pivotally connected to the arms of the lever 15, as indicated at 30, Fig. 2, and is engageable with the axially inner face of the rim of the wheel W.

Therefore, whenever air under pressure is admitted to the cylinders 10 and 18, through the intermediary, for example, of the usual manually operated control means provided for this purpose, the shoe as S is forced into engagement with the tread as T of the wheel as W and the composition friction material facings of the shoes 22 and 23 are respectively forced into engagement with the axially outer and axially inner faces of the rim of the wheel. Thus we afford both a metal-to-metal engagement and a composition friction material-to-metal engagement and thereby a deceleration entailing desirable characteristics is brought about.

It will be observed that both the shoe as S and the shoes as 22 and 23 are directly, that is, rigidly connected to the frame as F, whereas the wheel W is connected thereto through the springs as SP. Thus, even if there should be some deflection of the springs as SP in the course of a braking operation, the wheel as W will nevertheless be retained in rolling contact with the rail to thereby maintain the desired adhesion between the wheel and the rail. The foregoing will accrue primarily for the reason that the shoe as S and the shoes as 22 and 23 are rigidly connected to the farme and also are disposed to engage the wheel W at positions so related to each other that any tendency of the wheel to, in effect, bounce on the rail is resisted.

Still further and particularly by reason of the fact that the wheel is, in effect, spring-connected to the frame whereas the shoes are rigidly connected thereto, and since some spring deflection may arise in the course of a deceleration, we prefer to so arrange the rim 31 of the wheel that the shoes as 22 and 23 will remain in contact with the axially outer and axially inner faces of the rim 31 throughout a deceleration even though relative movement between the shoes and such faces of the rim radially of the wheel may occur in the course of a deceleration. Thus, as explained hereinabove and to refer particularly to a wheel such as used on passenger cars of railway equipment, such wheels are customarily about thirty-six inches in diameter and include a rim that is about two inches to about three and one-fourth inches in thickness. We, however, desirably increase this thickness of the rim by at least as much as one inch for so to do affords sufficient area radially of the wheel on the axially outer and axially inner faces 31 of the wheel that shoes as 22 and 23 will remain in engagement with such face or faces of the rim throughout a deceleration.

While it is often advantageous to effect decelerations through the intermediary of both a metal-to-metal engagement and a composition friction material-to-metal engagement, there may be instances where it will be desirable to effect decelerations solely through the intermediary of a metal-to-metal engagement or only a composition friction material-to-metal engagement. Thus if it is desired to effect decelerations solely through the intermediary of metal-to-metal engagements, the shoes as 22 and 23 embodying composition friction material facings, may be supplanted by metallic shoes desirably made of a metal such as that of which shoes as S are customarily made but, of course, in such circumstances the shoes will embody a configuration similar to that of the shoes as 22 and 23. Furthermore, if the decelerations are to be effected only through the intermediary of composition friction material-to-metal engagements, then the shoe as S may be provided with a facing of such material and in such circumstances shoes as 22 and 23 would be employed.

Among the important advantages which accrue from the utilization of the present invention on railway equipment is that a braking arrangement embodying shoes engageable with the axially inner and axially outer sides of the rim of a wheel, and also a shoe or shoes engageable with the tread or peripheral portion of a wheel, results in heat being distributed in the wheel substantially uniformly as an incident to the dissipation of energy which is effected when the shoes are applied to the wheel to bring about deceleration thereof. When shoes are so arranged relative to the wheel, the braking heat is applied to the wheel at three related and juxtaposed positions, relative to the radial plane of the wheel, and by applying the braking heat to the tread, which is the peripheral portion of the rim, and to the sides of the rim, relatively uniform heating of the rim of the wheel accrues. We have found this to be particularly advantageous where, as shown, for example, in the accompanying drawing, the shoe engageable with the tread of the wheel is disposed in substantially diametrical opposition to the position whereat the shoes engageable with the sides of the rim are located. The relatively uniform distribution of the braking heat in the wheel and particularly the rim thereof that accrues from the utilization of an arrangement of the aforesaid character has the desirable effect on the wheel of tending to coounteract the cold rolling of, and the hardening action on, the tread of the wheel that accrues from the rolling of the tread of the wheel on the rail.

Furthermore, and as is well appreciated, the application of a shoe or shoes to the tread of a wheel has a desirable scrubbing action which polishes and frees the tread of the wheel of rail splinters and the like that collect thereon. This tends to improve the adhesion that may be realized between the tread of the wheel and the rail on which the wheel rolls.

Moreover and particularly in those instances where shoes embodying facings of composition friction material are to be utilized, we have found it to be advantageous to apply the faces of such shoes to the axially inner and axially outer faces of a rotating member such as a wheel or disc or the like as, for example, in those instances where a disc is connected to a wheel to rotate therewith and shoes are arranged to be engageable with the axially inner and axially outer faces of such a disc. We have observed that when this is done there is a more uniform distribution of the braking heat in the rotating element than is realized when shoes are applied to the peripheral portion of such an element. However, an even more important advantage is that when shoes are applied to the axially inner and axially outer faces and irrespective of whether such shoes are metallic or embody composition friction material facings, the temperature rise in the member being decelerated by the application of the shoes thereto is minimized probably by reason of the fact that air may flow over the axially inner and axially outer faces in all directions, and particularly radially thereof, in contradistinction to the circumferential flow of air relied upon for the purpose of dissipating heat when shoes are applied to the peripheral portion of a rotating element as a wheel.

Likewise, it is to be understood that while it is advantageous to employ a braking arrangement of the character shown in the accompanying drawing wherein shoes are applied to both the peripheral portion of a rotating element and axially inner and axially outer faces of such an element, resort could be had to other arrangements for in some circumstances it may be advantageous to merely apply a shoe only to the axially inner or the axially outer face of the rotating element along with a shoe applied to the peripheral portion thereof, or in some circumstances it will be advantageous to apply shoes to both the axially inner or axially outer faces without applying a shoe to the peripheral portion.

It will be seen from the foregoing description that resort may be had to a variety of arrangements for realizing the hereinabove set forth objects of this invention, and in this respect it is to be understood that the illustrated form of our invention has been selected for purposes of describing the invention, and hence the invention is not to be considered as being limited to the selected embodiment that has been shown and described herein.

Moreover, while we have illustrated and described a selected embodiment of our invention, it is to be understood that this is capable of variation and modification and we therefore do not wish to be limited to the precise details set forth but desire to avail ourselves of such changes and alterations as may fall within the purview of the following claims.

We claim:

1. In a braking couple including a rotary member to be decelerated that embodies a plurality of braking surfaces, a plurality of braking elements, means supporting said elements for engagement with said braking surfaces, one of said braking surfaces being afforded on the peripheral face of said member and other of said braking surfaces being respectively afforded on the axially inner and axially outer faces of said member adjacent the peripheral face thereof, operating means effective to engage at least one of said braking elements with one of said braking surfaces, other operating means effective to engage at least one other of said braking elements with at least one other of said braking surfaces, and means for rendering said operating means operative simultaneously to thereby effect deceleration of said member, the relation among such surfaces and the engagement of the elements therewith being such that the heat dissipated in a deceleration induced as aforesaid will be relatively uniformly distributed in the portion of said member adjacent said surfaces.

2. In a braking couple including a rotary member to be decelerated that embodies a plurality of braking surfaces, a plurality of braking elements, means supporting said elements for engagement with said braking surfaces, one of said braking surfaces being afforded on the peripheral face of said member and other of said braking surfaces being respectively afforded on the axially inner and axially outer faces of said member adjacent the peripheral face thereof, operating means effective to engage at least one of said braking elements with one of said braking surfaces, to thereby effect deceleration of said member, the relation among such surfaces and the engagement of the elements therewith being such that the heat dissipated in a deceleration induced as aforesaid will be relatively uniformly distributed in the portion of said member adjacent said surfaces, the braking elements engageable with the braking surfaces on the axially inner and axially outer faces of the rotary member being supported to engage such surfaces substantially in alignment one with the other and the braking element engageable with the braking surface on the peripheral face of the rotary member being supported to engage such braking surface at a position disposed in substantially diametrically opposed relation with respect to the rotary member with the position whereat the braking elements engageable with the braking surfaces on the axially inner and axially outer faces of said member are supported to engage such surfaces.

3. In a braking couple including a wheel to be decelerated and which has a plurality of braking surfaces thereon, a plurality of braking elements, means supporting said elements for engagement with said braking surfaces, one of said braking surfaces being afforded on the peripheral face of the rim portion of said wheel and other of said braking surfaces being afforded on the axially inner and axially outer faces of the rim portion of said wheel, operating means effective to engage at least one of said braking elements with one of said braking surfaces, other operating means effective to engage at least one other of said braking elements with at least one other of said braking surfaces, and means for rendering said operating means operative simultaneously to thereby effect deceleration of said wheel, the relation among the braking surfaces on said rim portion and the engagement of the braking elements with such braking surfaces being such that the heat dissipated in a deceleration induced as aforesaid will be relatively uniformly distributed in the rim portion of said wheel adjacent said surfaces.

4. In a braking couple including a wheel to be decelerated and which has a plurality of braking surfaces thereon, a plurality of braking elements, means supporting said elements for engagement with said braking surfaces, one of said braking surfaces being afforded on the peripheral face of the rim portion of said wheel and other of said braking surfaces being respectively afforded on the axially inner and axially outer faces of the rim portion of said wheel, means effective to engage at least one of said braking elements with each of said braking surfaces to thereby effect deceleration of said wheel, the relation among the braking surfaces on said rim portion and the engagement of the braking elements with such braking surfaces being such that the heat dissipated in a deceleration induced as aforesaid will be relatively uniformly distributed in the rim portion of said wheel adjacent said surfaces, the braking elements engageable with the braking surfaces on the axially inner and axially outer faces of the rim portion of the wheel being supported to engage such surfaces substantially in alignment one with the other and the braking element engageable with the braking surface on the peripheral face of the rim portion of the wheel being supported to engage such braking surface at a position disposed in substantially diametrically opposed relation with respect to the wheel with the position whereat the braking elements engageable with the braking surfaces on the axially inner and axially outer faces are supported to engage such surfaces.

5. In a braking couple including a rotary member to be decelerated that embodies a plurality of braking surfaces, a plurality of braking elements, means supporting said elements for engagement with at least selected of the braking surfaces, one of said braking surfaces being afforded on the peripheral face of said member and at least another of said braking surfaces being afforded on the axially inner or axially outer face of said member adjacent the peripheral face thereof, operating means effective to engage at least one of said braking elements with the braking surface on the peripheral face of said member, other operating means effective to engage at least one other of said elements with the braking surface on the axially inner or axially outer face of said member, and means for rendering said operating means operative simultaneously to thereby effect deceleration of said member, the relation among the surfaces engaged by said elements and the engagement of the elements therewith being such that the heat dissipated in a deceleration induced as aforesaid will be relatively uniformly distributed in the portion of said member adjacent said surfaces.

6. In a braking couple including a rotary member to be decelerated that embodies a plurality of braking surfaces, a plurality of braking elements, means supporting said elements for engagement with at least selected of the braking surfaces, one of said braking surfaces being afforded on the peripheral face of said member and at least another of said braking surfaces being afforded on the axially inner or axially outer face of said member adjacent the peripheral face thereof, and operating means effective to engage at least one of said braking elements with the braking surface on the peripheral face of said member, other operating means effective to engage at least one other of said elements with the braking surface on the axially inner or axially outer face of said member, and means for rendering said operating means operative simultaneously to thereby effect deceleration of said member, the relation among the surfaces engaged by said elements and the engagement of the elements therewith being such that the heat dissipated in a deceleration induced as aforesaid will be relatively uniformly distributed in the portion of said member adjacent said surfaces, the braking element engageable with the braking surface on the peripheral face of the rotary member being supported to engage such braking surface at a position in substantially diametrically opposed relation with respect to the rotary member with the position on the rotary member whereat a braking element engageable with a braking surface on the axially inner or axially outer face of the rotary member is supported for engagement with such braking surface.

7. In a braking couple including a rotary member to be decelerated that embodies a plurality of braking surfaces, a plurality of braking elements, means supporting said elements for engagement with said braking surfaces, one of said braking surfaces being afforded on the peripheral face of said member and other of said braking surfaces being respectively afforded on the axially inner and axially outer faces of said member adjacent the peripheral face thereof, operating means effective to engage at least one of said braking elements with one of said braking surfaces, to thereby effect deceleration of said member, the relation among such surfaces and the engagement of the elements therewith being such that the heat dissipated in a deceleration induced as aforesaid will be relatively uniformly distributed in the portion of said member adjacent said surfaces, the braking elements engageable with the braking surfaces on the axially inner and axially outer faces of the rotary member being shaped to be substantially complementary to the circumferential extent of such surfaces and being sized to be coextensive with but a part of such surfaces and the radial extent of such surfaces being sufficiently greater than the extent of the elements radially of the rotary member as to insure that the elements will remain in engagement with the surfaces in the event of relative movement between the elements and the surfaces radially of the member in the course of a deceleration of the member induced at least in part by the engagement of such elements with such surfaces.

8. In a braking couple including a wheel to be decelerated and which has a plurality of braking surfaces thereon, a plurality of braking elements, means supporting said elements for engagement with said braking surfaces, one of said braking surfaces being afforded on the peripheral face of the rim portion of said wheel and other of said braking surfaces being respectively afforded on the axially inner and axially outer faces of the rim portion of said wheel, means effective to engage at least one of said braking elements with each of said braking surfaces to thereby effect deceleration of said wheel, the relation among the braking surfaces on said rim portion and the engagement of the braking elements with such braking surfaces being such that the heat dissipated in a deceleration induced as aforesaid will be relatively uniformly distributed in the rim portion of said wheel adjacent said surfaces, the braking elements engageable with the braking surfaces on the axially inner and axially outer faces of the rim portion of the wheel being shaped to be substantially complementary to the circumferential extent of such surfaces and being sized to be coextensive with but a part of such surfaces and the radial extent of such surfaces being sufficiently greater than the extent of the elements radially of the rim portion of the wheel as to insure that the elements will remain in engagement with the surfaces in the event of relative movement between the elements and the surfaces radially of the wheel in the course of a deceleration of the wheel induced at least in part by the engagement of such elements with such surfaces.

9. In a braking couple as claimed in claim 1 wherein one of the braking surfaces and the element engageable therewith are constituted and arranged to afford a metal-to-metal engagement and wherein another of the braking surfaces and the element engageable therewith are constituted and arranged to afford a composition friction material-to-metal engagement.

10. In a braking couple as claimed in claim 1 wherein the braking element engageable with the braking surface on the peripheral face of the rotary member and such surface are constituted and arranged to afford a metal-to-metal engagement and wherein at least one of the braking elements engageable with a braking surface on an axially inner or axially outer face on said member are constituted and arranged to afford a composition friction material-to-metal engagement.

11. In a braking couple as claimed in claim 3 wherein the braking element engageable with the braking surface on the peripheral face of the rim portion of the wheel and such surface are constituted and arranged to afford a metal-to-metal engagement and wherein at least one of the braking elements engageable with a braking surface on an axially inner or axially outer face on the rim portion of the wheel are constituted and arranged to afford a composition friction material-to-metal engagement.

12. In a braking couple as claimed in claim 5 wherein one of the braking surfaces and the element engageable therewith are constituted and arranged to afford a metal-to-metal engagement and wherein another of the braking surfaces and the element engageable therewith are constituted and arranged to afford a composition friction material-to-metal engagement.

13. In a braking couple including a rotary member to be decelerated that embodies a plurality of braking surfaces, a plurality of braking elements, means supporting said elements for engagement with said braking surfaces, one of said braking surfaces being afforded on the peripheral face of said member and other of said braking surfaces being respectively afforded on the axially inner and axially outer faces of said member adjacent the peripheral face thereof, operating means effective to engage at least one of said braking elements with one of said braking surfaces, to thereby effect deceleration of said member, the relation among such surfaces and the engagement of the elements therewith being such that the heat dissipated in a deceleration induced as aforesaid will be relatively uniformly distributed in the portion of said member adjacent said surfaces, the braking elements engageable with the braking surfaces on the axially inner and axially outer faces of the rotary member being supported to engage such surfaces substantially in alignment one with the other and the braking element engageable with the braking surface on the peripheral face of the rotary member being supported to engage such braking surface at a position disposed in substantially diametrically opposed relation with respect to the rotary member with the position whereat the braking elements engageable with the braking surfaces on the axially inner and axially outer faces of said member are supported to engage such surfaces, the braking element engageable with the braking surface of the peripheral face of the rotary member and such surface being constituted and arranged to afford a metal-to-metal engagement and at least one of the braking elements engageable with the braking surface on an axially inner or axially outer face on said member being constituted and arranged to afford a composition friction material-to-metal engagement.

14. In a braking couple including a wheel to be decelerated and which has a plurality of braking surfaces thereon, a plurality of braking elements, means supporting said elements for engagement with said braking surfaces, one of said braking surfaces being afforded on the peripheral face of the rim portion of said wheel and other of said braking surfaces being respectively afforded on the axially inner and axially outer faces of the rim portion of said wheel, means effective to engage at least one of said braking elements with each of said braking surfaces to thereby effect deceleration of said wheel, the relation among the braking surfaces on said rim portion and the engagement of the braking elements with such braking surfaces being such that the heat dissipated in a deceleration induced as aforesaid will be relatively uniformly distributed in the rim portion of said wheel adjacent said surfaces, the braking elements engageable with the braking surfaces on the axially inner and axially outer faces of the rim portion of the wheel being supported to engage such surfaces substantially in alignment one with the other and the braking element engageable with the braking surface and the peripheral face of the rim portion of the wheel being supported to engage such braking surface at a position disposed in substantially diametrically opposed relation with respect to the wheel with the position whereat the braking elements engageable with the braking surfaces on the axially inner and axially outer faces are supported to engage such surfaces, the braking element engageable with the braking surface of the peripheral face of the rim portion of the wheel and such surfaces being constituted and arranged to afford a metal-to-metal engagement, and the braking elements engageable with the braking surfaces on the axially inner and axially outer faces of the rim portion of the wheel and such surfaces each being constituted and arranged to afford a composition friction material-to-metal engagement.

15. In a braking couple including a wheel to be decelerated and which has a plurality of braking surfaces thereon and which is resiliently connected to a frame, a plurality of braking elements, means supporting said elements for engagement with said braking surfaces, one of said braking surfaces being afforded on the peripheral face of the rim portion of said wheel and other of said braking surfaces being respectively afforded on the axially inner and axially outer faces of the rim portion of said wheel, means effective to simultaneously engage at least one of said braking elements with each of said braking surfaces to thereby effect deceleration of said wheel, the relation among the braking surfaces on said rim portion and the engagement of the braking elements with such braking surfaces being such that the heating of the rim portion of said wheel incidental to dissipation of energy in a deceleration induced as aforesaid will be uniformly effected, said supporting means being constituted and arranged to support at least one of said braking elements for engagement with its cooperating braking surface at a position disposed at least partially below the horizontal center plane of the wheel whereby the resilient connection of the wheel to the frame is snubbed in the course of deceleration effected by engagement of said braking elements with the braking surfaces.

16. In a braking couple including a wheel to be decelerated and which has a plurality of braking surfaces thereon and which is resiliently connected to a frame, a plurality of braking elements, means supporting said elements for engagement with said braking surfaces, one of said braking surfaces being afforded on the peripheral face of the rim portion of said wheel and other of said braking surfaces being respectively afforded on the axially inner and axially outer faces of the rim portion of said wheel, operating means effective to engage at least one of said braking elements with one of said braking surfaces, other operating means effective to engage at least one other of said braking elements with at least one other of said braking surfaces, and means for rendering said operating means operative simultaneously to thereby effect deceleration of said wheel, the relation among the braking surfaces on said rim portion and the engagement of the braking elements with such surfaces being such that the heat dissipated in a deceleration induced as aforesaid will be relatively uniformly distributed in the rim portion of said wheel adjacent said surfaces, said supporting means being constituted and arranged to support at least one of said braking elements for engagement with its cooperating braking surface at a position disposed at least partially below the horizontal center plane of the wheel whereby the resilient connection of the wheel to the frame is snubbed in the course of deceleration effected by engagement of said braking elements with the braking surfaces.

R. B. POGUE.
MAURICE N. TRAINER.